United States Patent
Gollapudi et al.

(10) Patent No.: US 10,146,439 B2
(45) Date of Patent: Dec. 4, 2018

(54) SYSTEM AND METHOD FOR HIGH PERFORMANCE LOCKLESS SCALABLE TARGET

(71) Applicant: SAMSUNG ELECTRONICS CO., LTD., Suwon-si, Gyeonggi-do (KR)

(72) Inventors: Venkata Bhanu Prakash Gollapudi, Santa Clara, CA (US); Vijaya Jakkula, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 344 days.

(21) Appl. No.: 15/209,566

(22) Filed: Jul. 13, 2016

(65) Prior Publication Data
US 2017/0300228 A1    Oct. 19, 2017

Related U.S. Application Data

(60) Provisional application No. 62/322,035, filed on Apr. 13, 2016.

(51) Int. Cl.
*G06F 3/06* (2006.01)
*G06F 9/48* (2006.01)
*G06F 13/38* (2006.01)

(52) U.S. Cl.
CPC .......... *G06F 3/061* (2013.01); *G06F 3/067* (2013.01); *G06F 3/0659* (2013.01); *G06F 9/4806* (2013.01); *G06F 13/38* (2013.01)

(58) Field of Classification Search
CPC ........ G06F 3/061; G06F 3/0659; G06F 3/067; G06F 9/4806; G06F 13/38
See application file for complete search history.

(56) References Cited

U.S. PATENT DOCUMENTS

| | | | |
|---|---|---|---|
| 5,421,014 A * | 5/1995 | Bucher | G06F 9/4843 710/305 |
| 7,353,305 B2 | 4/2008 | Pangal et al. | |
| 7,720,064 B1 | 5/2010 | Rohde | |
| 7,941,645 B1 * | 5/2011 | Riach | G06T 1/20 712/220 |

(Continued)

OTHER PUBLICATIONS

Yingping Lu et al., "Simulation Study of iSCSI-based Storage System," Mass Storage Systems & Technologies (MSST), Apr. 2004, pp. 101-110, Maryland, USA.

*Primary Examiner* — Tim T Vo
*Assistant Examiner* — Phong H Dang
(74) *Attorney, Agent, or Firm* — Innovation Counsel LLP

(57) ABSTRACT

A method for accessing data stored in a target of a data storage system includes: running a plurality of transport threads on a first group of CPUs, wherein each of the plurality of transport threads comprises a command receiver path and a command transmitter path; running a plurality of data path threads on a second group of CPUs, wherein each of the plurality of data path threads comprises a command issue path and a command completion path; posting an I/O command to an I/O command issue queue using the command receive path of a transport thread, and processing the I/O command using the command issue path of a data path thread; and posting an I/O completion notification to an I/O completion queue using the command completion path of the data path thread, and processing the I/O completion notification using the command transmitter path of the transport thread.

24 Claims, 9 Drawing Sheets

(56) References Cited

U.S. PATENT DOCUMENTS

| | | | |
|---|---|---|---|
| 7,953,878 B1 | 5/2011 | Trimble | |
| 8,139,482 B1 | 3/2012 | Eiriksson et al. | |
| 8,149,854 B2* | 4/2012 | Lau | G06F 13/385 |
| | | | 370/412 |
| 8,180,973 B1 | 5/2012 | Armangau et al. | |
| 8,196,147 B1* | 6/2012 | Srinivasan | H04L 67/2842 |
| | | | 711/118 |
| 8,566,833 B1 | 10/2013 | Biswas et al. | |
| 2004/0049603 A1* | 3/2004 | Boyd | G06F 13/102 |
| | | | 710/1 |
| 2006/0095606 A1* | 5/2006 | Emmes | G06F 13/4022 |
| | | | 710/46 |
| 2007/0156974 A1 | 7/2007 | Haynes, Jr. et al. | |
| 2011/0252198 A1 | 10/2011 | Ogasawara et al. | |
| 2013/0014118 A1* | 1/2013 | Jones | G06F 9/52 |
| | | | 718/104 |
| 2014/0281087 A1* | 9/2014 | Talpey | G06F 13/24 |
| | | | 710/263 |
| 2015/0134841 A1* | 5/2015 | Lojewski | H04L 69/321 |
| | | | 709/228 |
| 2016/0321010 A1* | 11/2016 | Hashimoto | G06F 12/0246 |
| 2017/0075834 A1* | 3/2017 | Cha | G06F 13/24 |
| 2017/0083252 A1* | 3/2017 | Singh | G06F 3/0619 |
| 2017/0199772 A1* | 7/2017 | Chen | G06F 9/526 |
| 2017/0262178 A1* | 9/2017 | Hashimoto | G06F 3/0604 |
| 2017/0300229 A1* | 10/2017 | Jakkula | G06F 3/061 |

\* cited by examiner

SYSTEM AND METHOD FOR HIGH PERFORMANCE LOCKLESS SCALABLE TARGET

CROSS-REFERENCE TO RELATED APPLICATION(S)

This application claims the benefits of and priority to U.S. Provisional Patent Application Ser. No. 62/322,035 filed Apr. 13, 2016, the disclosure of which is incorporated herein by reference in its entirety.

TECHNICAL FIELD

The present disclosure relates generally to a data storage system, more particularly, to a system and method for providing a high performance lockless scalable target.

BACKGROUND

In a typical storage area network (SAN), a target exposes persistent data storage spaces (e.g., a logical unit number (LUN), a namespace) to one or more initiators via a Fiber connection or a switching network. An initiator refers to an endpoint that initiates an interface session (e.g., a small computer system interface (SCSI) session) and sends a command (e.g., a SCSI command). A target refers to an endpoint that waits for an initiator's work requests and performs input/output (I/O) operations. In the context of a general computer architecture, an initiator may be referred to as a client, and a target may be referred to as a server. A single target may serve a plurality of initiators and provide the initiators with one or more LUNs.

A target may communicate with one or more initiators via a mutually agreed SAN protocol. Examples of the SAN protocol include, but are not limited to, Fibre Channel Protocol (FCP), parallel SCSI (pSCSI), Internet small computer system interface (iSCSI), HyperSCSI, Fibre Channel, Advanced Technology Attachment (ATA), Serial ATA (SATA), ATA over Ethernet (AoE), InfiniBand, and Non-Volatile Memory Express (NVMe) over Fabrics. The SAN protocol allows an initiator to send I/O commands to a target. Data storage devices of a data center may include a plurality of targets that may be physically and/or logically distributed over a storage area network. The SAN protocol consolidates the data storage devices into arrays of targets while providing an illusion to a host that the data storage devices appear to be locally attached.

Storage targets typically may expose the backend LUNs to multiple initiators via multiple connections. Each initiator can open one or more connections with a target and access one or more LUNs in the target. From an input/output (I/O) flow point of view, multiple synchronization points established in a data path can affect the I/O performance, especially when multiple sessions access multiple LUNs in parallel.

A data path in the frontend I/O stack may be split into a transport protocol layer and a SCSI core layer. Processing in the transport protocol is per-connection based, while processing in the SCSI core layer is per-LUN based. The processing in the transport layer includes issuing the I/O commands on a particular connection and completing them on that particular connection. The LUN processing in the core layer includes issuing I/O commands to a particular LUN and completing the I/O commands issued to the particular LUN. If the entire I/O path is executed in a thread context of the transport protocol layer, various synchronization points may be established at the LUN level as well as at the connection level, thus affecting the overall I/O performance. This is because the I/O context at the transport protocol layer is connection specific whereas the I/O context in SCSI core layer is LUN specific.

SUMMARY

According to one embodiment, a method includes: receiving commands to access data stored in a target of a data storage system, wherein the data storage system includes a plurality of CPUs; running a plurality of transport threads on a first group of CPUs of the plurality of CPUs, wherein each of the plurality of transport threads comprises a command receiver path and a command transmitter path; running a plurality of data path threads on a second group of CPUs of the plurality of CPUs, wherein each of the plurality of data path threads comprises a command issue path and a command completion path; posting an I/O command to an I/O command issue queue using the command receive path of a transport thread, and processing the I/O command using the command issue path of a data path thread; and posting an I/O completion notification to an I/O completion queue using the command completion path of the data path thread, and processing the I/O completion notification using the command transmitter path of the transport thread. The I/O command issue queue comprises a first array of queues, and each of the first array of queues corresponds to a respective CPU of the first group of CPUs. The I/O completion queue comprises a second array of queues, and each of the second array of queues corresponds to a respective CPU of the second group of CPUs.

According to another embodiment, a data storage system includes: a plurality of CPUs; a plurality of targets; and a memory storing a set of software modules for processing I/O flows and an I/O command issue queue, and an I/O completion queue. The set of software modules is configured to: receive I/O commands to access data stored in a target of a data storage system, the data storage system includes a plurality of CPUs; run a plurality of transport threads on a first CPU among a first group of CPUs of the plurality of CPUs, wherein each of the plurality of transport threads comprises a command receiver path and a command transmitter path; and run a plurality of data path threads on a second CPU among a second group of CPUs of the plurality of CPUs, wherein each of the plurality of data path threads comprises a command issue path and a command completion path. The command receiver path of a transport thread posts an I/O command to the I/O command issue queue, and the command issue path of a data path thread processes the I/O command. The command completion path of the data path thread posts an I/O completion notification to the I/O completion queue, and the command transmitter path of the transport thread processes the I/O completion notification. The I/O command issue queue comprises a first array of queues, and each of the first array of queues corresponds to a respective CPU of the first group of CPUs. The I/O completion queue comprises a second array of queues, and each of the second array of queues corresponds to a respective CPU of the second group of CPUs.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
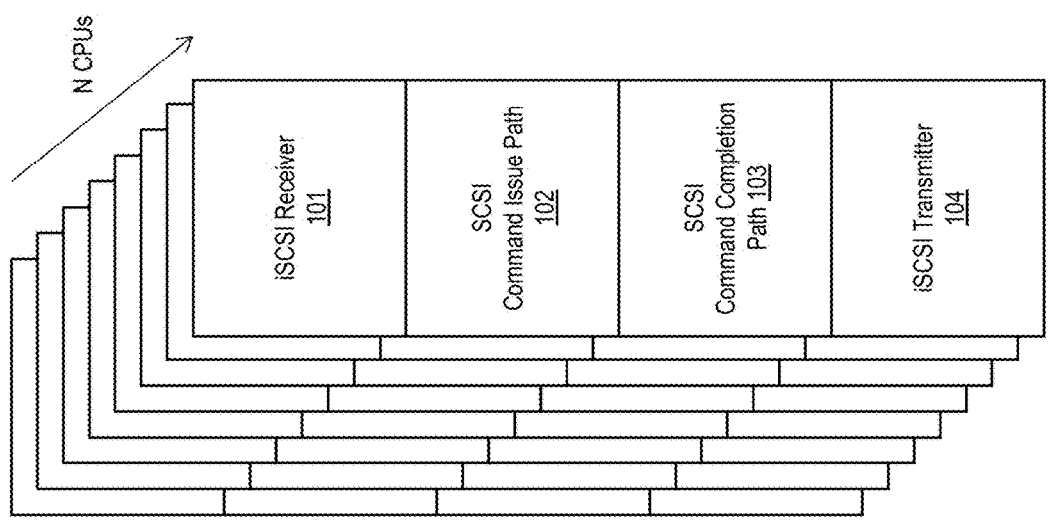
FIG. 1 illustrates an exemplary diagram of a monolithic data path in a threading model, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a high performance lockless scalable target. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 illustrates an exemplary diagram of a data path in a monolithic threading model, according to one embodiment. A data path includes a monolithic sequence of an iSCSI receiver path 101, a SCSI command issue path 102, a SCSI command completion path 103, and an iSCSI transmitter path 104. A storage system may have a plurality of central processing units (CPUs) (e.g., N number of CPUs), and each CPU of the storage system is responsible for establishing, processing, managing, and completing a respective data path throughout the lifecycle of the data path. Among the data paths 101-104, the data paths 101 and 104 are established in a transport protocol (i.e., iSCSI) between an initiator and a SCSI target and based on per connection. For example, a login/logout, buffer management, and task management handling are performed at a session/connection level based on per connection. I/O commands are queued and tracked at the session/connection level. Among the data paths 101-104, the data paths 102 and 103 are established between a SCSI target and LUNs at a LUN level. For example, SCSI commands to and from a target storage device and error handling are tracked at the LUN level. According to a monolithic thread model illustrated in FIG. 1, the available CPU resources of a target system are shared to run both the transport protocol and the SCSI core level protocol. The monolithic threading model does not maximize cache locality.

The present disclosure provides a novel threading model that splits and handles transport protocols and SCSI core protocols independently on separate threads. The present threading model employs a lockless queue design between a transport protocol thread and a SCSI core thread. The lockless queue design improves I/O performance by splitting and independently running threads for the transport protocols and the SCSI core protocols. The CPU resources of a storage system are distributed between a transport protocol layer and a SCSI core layer. The transport protocol threads are only scheduled on those CPUs that are assigned to handle the threads running in the transport protocol layer. The SCSI core threads are only scheduled on CPUs that are assigned to handle the threads running in the SCSI core layer. The transport protocol threads process a receive path and a transmit path. The SCSI core threads process I/O requests on to a particular LUN and I/O completion on that particular LUN.

The present system and method provides high scalability with a plurality of LUNs and connections thereto. The present system and method further separates the transport protocol threads and the LUN threads to maximize cache locality. Furthermore, the lockless queue design eliminates lock contention when multiple LUNs are accessed via multiple connections. Although the present disclosure is described with respect to an iSCSI target, it is understood that the present disclosure may be applied to any SAN protocol (e.g., FCP, pSCSI, iSCSI, HyperSCSI, Fibre Channel, ATA, SATA, AoE, InfiniBand, and NVMe over Fabrics) to take advantage of efficiently using system resources and providing high performance target I/O performance to avoid synchronization bottlenecks. For example, in NVMe over Fabrics protocol, the core layer that is equivalent to SCSI core layer may be referred to as NVMe Queuing interface and command sets.

Figure 2:
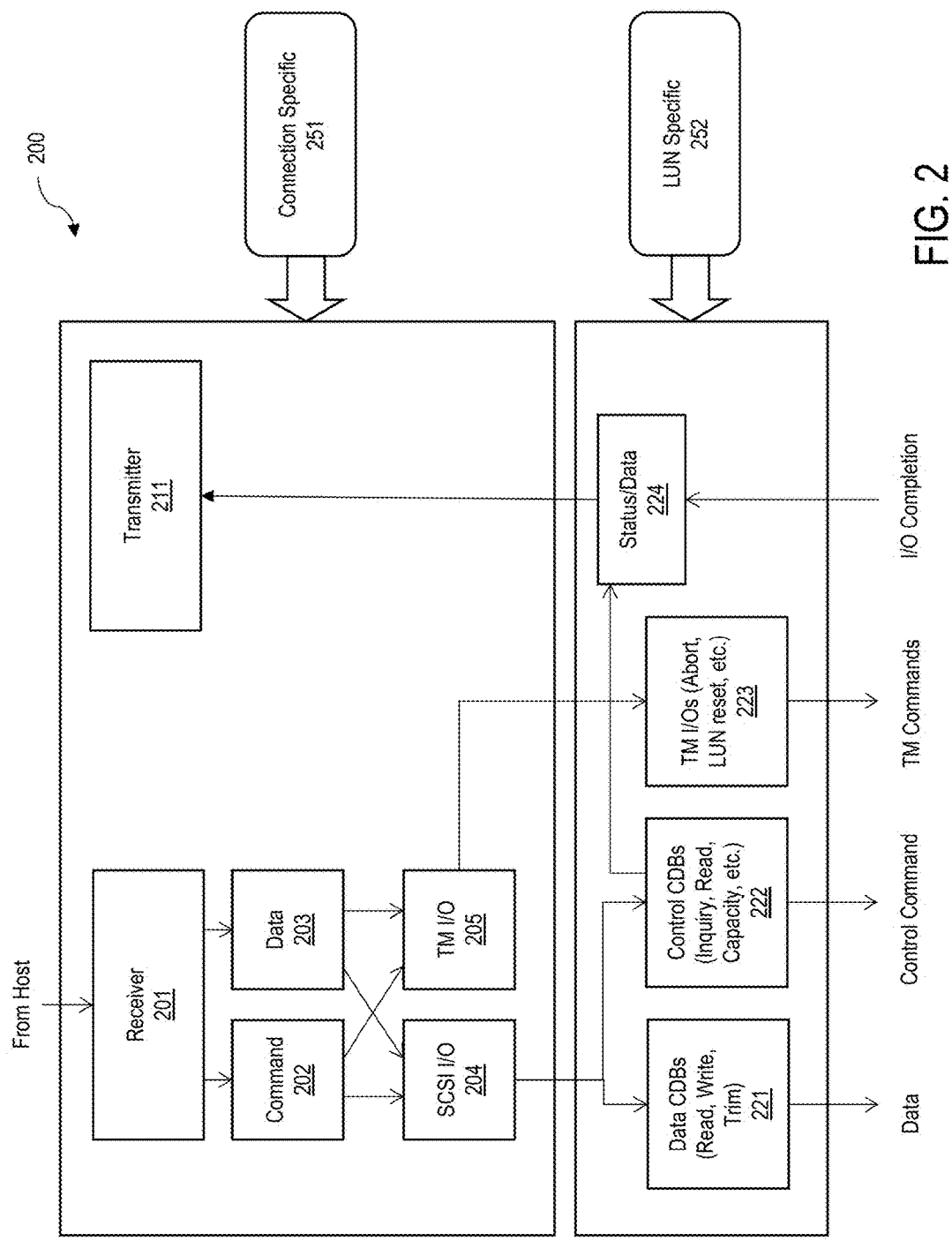
FIG. 2 illustrates a block diagram of an example threading model, according to one embodiment.

FIG. 2 illustrates a block diagram of a data path in an example threading model, according to one embodiment. A data path 200 can be divided into a connection-specific path 251 and a LUN-specific path 252. The connection-specific path 251 includes a receiver 201 and a transmitter 211. The receiver 201 of an initiator (client) receives an instruction from a host, generates an iSCSI command 202 and associated data 203, establishes a connection with a target, and sends the iSCSI command 202 and the data 203 to the target via an SCSI I/O module 204 and a task management (TM) I/O module 205.

The LUN-specific path 252 includes data command descriptor blocks (CDBs) 221 for storing data associated with SCSI commands such as read, write and trim, control CDBs 222 for storing SCSI commands such as an inquiry, a read, and a capacity. The iSCSI command and the data are respectively stored in the data CDBs 221 and the control CDBs 222. The LUN-specific path 252 further includes a task management I/O block for storing SCSI management commands (e.g., an abort, a LUN reset), and a status/data block 224. The TM commands received from the host may be stored in the task management I/O block. The status of the target and associated data received from the target are stored in the status/data block 224. The control CDBs 222 may directly access the status/data block 224 for updating the status and data for a particular control command. The status/data information for the target such as I/O completion is sent back to the transmitter 211 of the connection-specific path 251.

Figure 3:
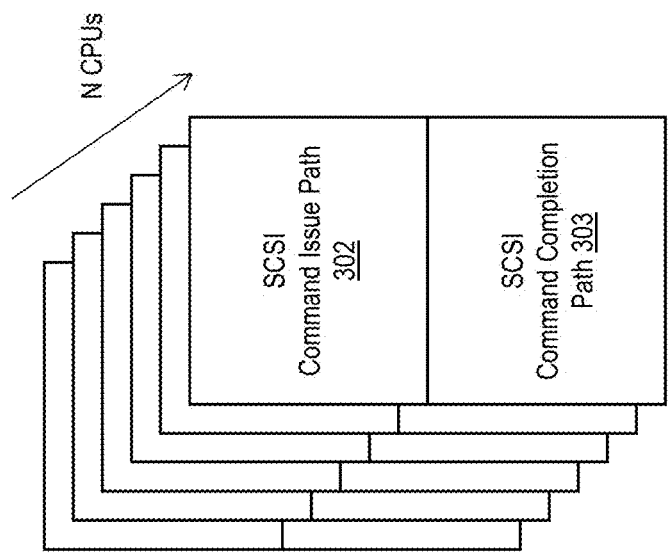
FIG. 3 illustrates an exemplary split threading model, according to one embodiment.
Figure 3:
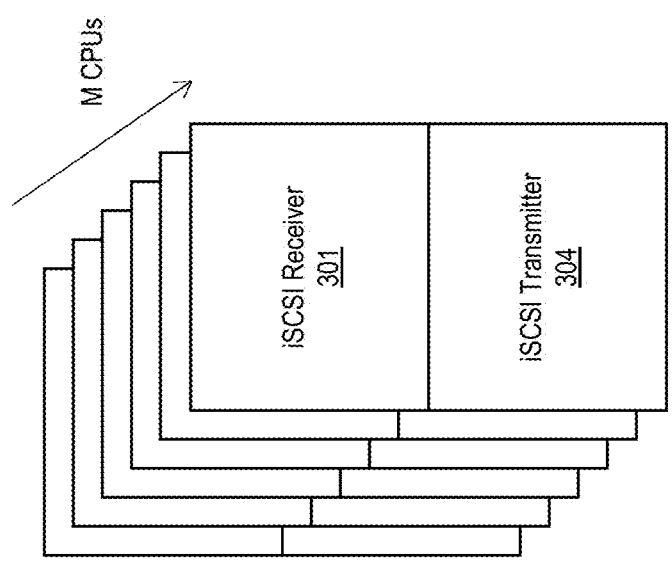

FIG. 3 illustrates an exemplary split threading model, according to one embodiment. A target system may include a number of CPUs that are distributed for handling between the iSCSI transport protocols and SCSI commands based on a type of a work load. A connection-specific thread (i.e., iSCSI in transport protocol) includes iSCSI receiver path 301 and iSCSI transmitter path 304 between an initiator and a SCSI target. The connection-specific thread is based on per connection. The SCSI command issue path 302 and the SCSI command completion path 303 are established at a LUN level. Among the number of available CPUs in the target system, M number of CPUs are assigned for establishing a data path, transporting SCSI commands between the initiator and the SCSI target, and completing an established data path at a transport protocol layer whereas the N number of CPUs are assigned for processing, managing, and handling SCSI commands between the SCSI target and the LUNs.

The iSCSI protocol between the initiator and the SCSI target runs a connection-specific thread that is established per connection and includes a sequence of iSCSI receiver path 301 and iSCSI transmitter path 304. The connection-specific thread is assigned to one or more of the M number of CPUs. The iSCSI receiver path 301 queues SCSI I/O requests including a SCSI command issue path 302 (i.e., SCSI receiver). After completing the SCSI command, the SCSCI target queues a SCSI command completion path 303 (i.e., SCSI transmitter). The SCSI command issue path 302 and the SCSI command completion path 303 established on a per-LUN basis are assigned to the N number of CPUs. After completing the SCSI commands, the SCSI target queues I/O completion (e.g., iSCSI transmitter path 304) to the initiator on the previously established transport connection between the initiator and the SCSI target. Finally, the I/O completion is handled by the CPU(s) that established the connection-specific thread between the initiator and the SCSI target.

Figure 4:
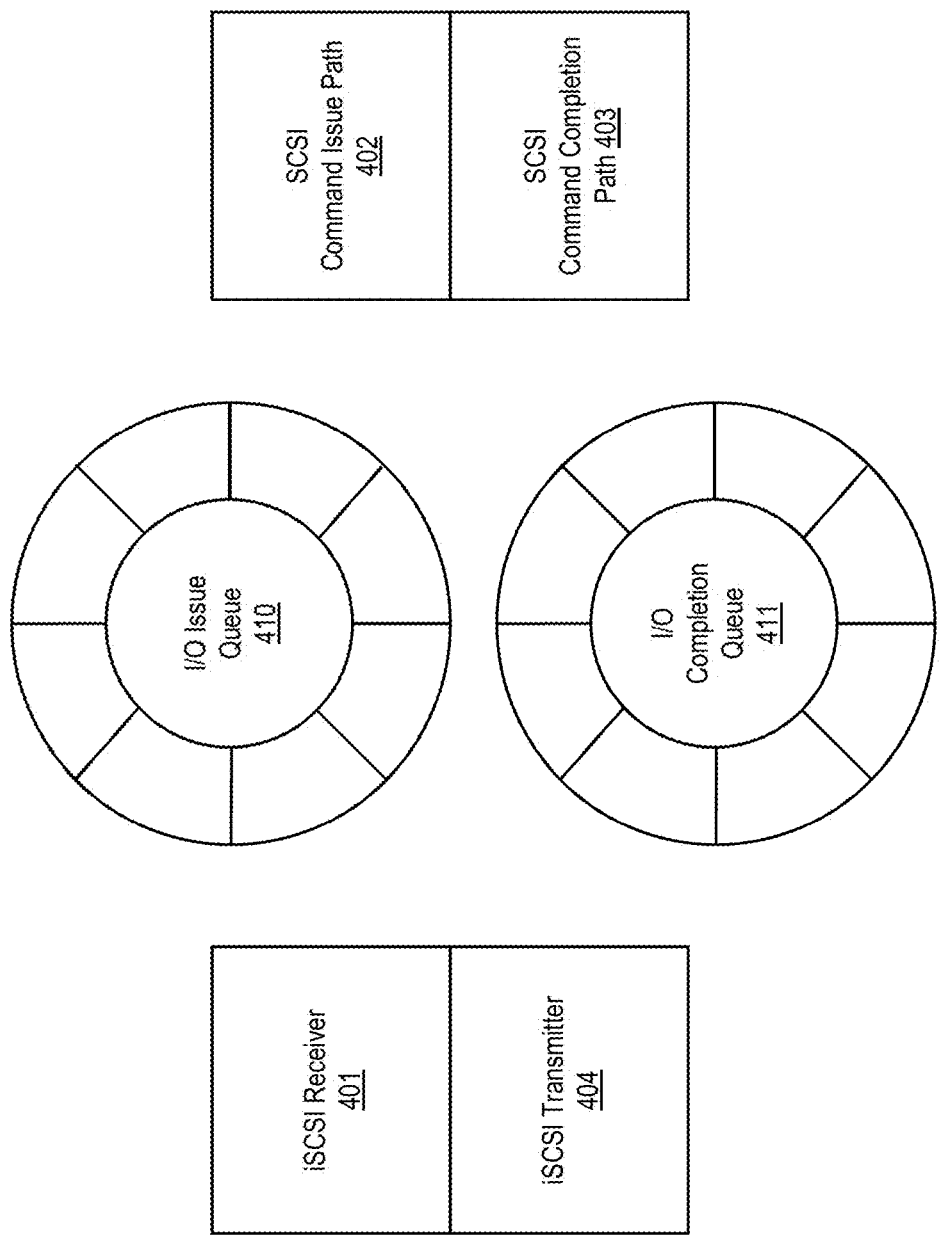
FIG. 4 illustrates a schematic diagram for an example threading model, according to one embodiment.

FIG. 4 illustrates a schematic diagram for an example threading model, according to one embodiment. The present threading model provides a data path including an iSCSI receiver path 401, an iSCSI transmitter path 404, a SCSI command issue path 402, and a SCSI command completion path 403. On an I/O command issue path, the iSCSI receiver path 401 uses an I/O command issue queue 410 to post I/O commands to the SCSI command issue path 402. On an I/O command return path, the SCSI command completion path 403 uses an I/O completion queue 411 to post I/O completions to the iSCSI transmitter path 404. According to one embodiment, the I/O command issue queue 410 and the I/O completion queue 411 are multi-producer and multi-consumer (MPMC) lockless queues where I/O commands from multiple connections can reach a single LUN and I/O commands from a single connection can reach multiple LUNs.

In the context of queues, a producer refers to an initiator, and a consumer refers to a target, according to one embodiment. In some embodiments, a producer may refer to a target, and a consumer may refer to an initiator. For example, the iSCSI receiver path 401 and iSCSI transmitter path 404 may be owned by a producer, and the SCSI command issue path 402 and the SCSI command completion path 403 may be owned by a consumer. In another example, the SCSI command issue path 402 and the SCSI command completion path 403 may be owned by a producer, and the iSCSI receiver path 401 and iSCSI transmitter path 404 may be owned by a consumer.

In a multi-producer/multi-consumer (MPMC) queue, producer tasks and consumer tasks are running on multiple threads. For example, producer tasks are running on n number of threads, and consumers are running on m number of threads. There can be multiple producers that are bound to a particular producer thread, and multiple consumers that are bound to a particular consumer thread. In an I/O issue path, the transport protocol layer generates work requests to the SCSI core layer. In this case, the transport protocol layer is a producer, and the SCSI core layer is a consumer. In an I/O completion path, on the other hand, the SCSI core layer generates the work requests to the transport protocol layer. In this case, the SCSI core layer is a producer, and the transport protocol layer is a consumer. The work requests generated by the transport protocol layer that is per connection can go to multiple LUNs. Similarly, work requests generated by the SCSI core layer that is per LUN can go to multiple connections. The communication between the transport protocol layer and the SCSI core layer has synchronization points that typically require locks. According to one embodiment, the present system allows the transport protocol layer and the SCSI core layer to be accessed in a lockless manner.

Figure 5:
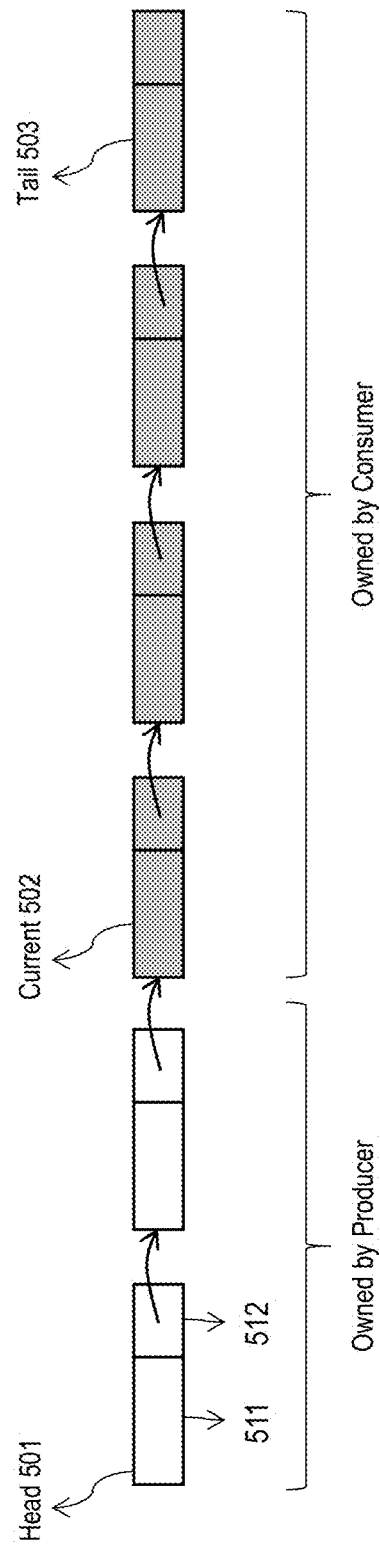
FIG. 5 illustrates a block diagram of an example single-producer single-consumer (SPSC) lockless queue, according to one embodiment.

FIG. 5 illustrates a block diagram of an example single-producer single-consumer (SPSC) lockless queue, according to one embodiment. Each node in the lockless queue includes a data container and a pointer, and a series of nodes are linked in a linked list. According to one embodiment, each of the I/O command issue queue 410 and I/O completion queue 411 of FIG. 4 can have a lockless queue illustrated in FIG. 5. The present lockless queue has a head node 501, a tail node 503. If there is only a single node in the queue, the head node 501 and the tail node 503 are the same. A current node 502 refers to a starting point in the list from which a consumer can start list traversal and consume the node. In some embodiments, the current node 502 may be referred to as a consumer start or a consumer head (as opposed to head node 501 that is owned by a producer).

Each node of the linked list shown in FIG. 5 has a data container 511 and a pointer 512 that points to the next node. A producer creates a new node, for example, a node corresponding to a new I/O command, links the newly created node to the tail node 503 of the queue, and updates a pointer of the tail node 503 to point to the new node. In this way, a new node can be added to an existing queue. Similarly, the producer can free up consumed nodes from the head node 501 to the current node 502. The producer may free up consumed nodes when the system resources are available, independently from the node consumption process by the consumer. In this sense, the process of freeing up consumed node by the producer is referred to as a lazy delete. The nodes from the head node 501 to a node before the current node 502 are owned by the producer whereas the nodes from the current node 502 to the tail node 503 are owned by the consumer. A consumer traverses the list from the current node 502 to the tail node 503, consumes the item at the current node 502, and updates the current pointer to the following node. The consumer does not consume nodes if the current pointer points to the tail node 503.

The present lockless queue provides a control structure that holds control information to manage a lockless list. The producer owns the first and the last pointers. The last pointer is updated when a new node is added to the lockless list by the producer. The first pointer is updated when the producer deletes consumed nodes. As the consumer traverses the list from the current node 502 to the tail node 503, the current pointer is updated by the consumer. Because the control information and the ownership of the current pointer of the lockless queue are seamlessly exchanged between the producer and the consumer using the control structure of the lockless queue, the present lockless queue eliminates a need for synchronization points and locks in a data path and improve the I/O performance, especially when multiple sessions access multiple LUNs in parallel.

Figure 6:
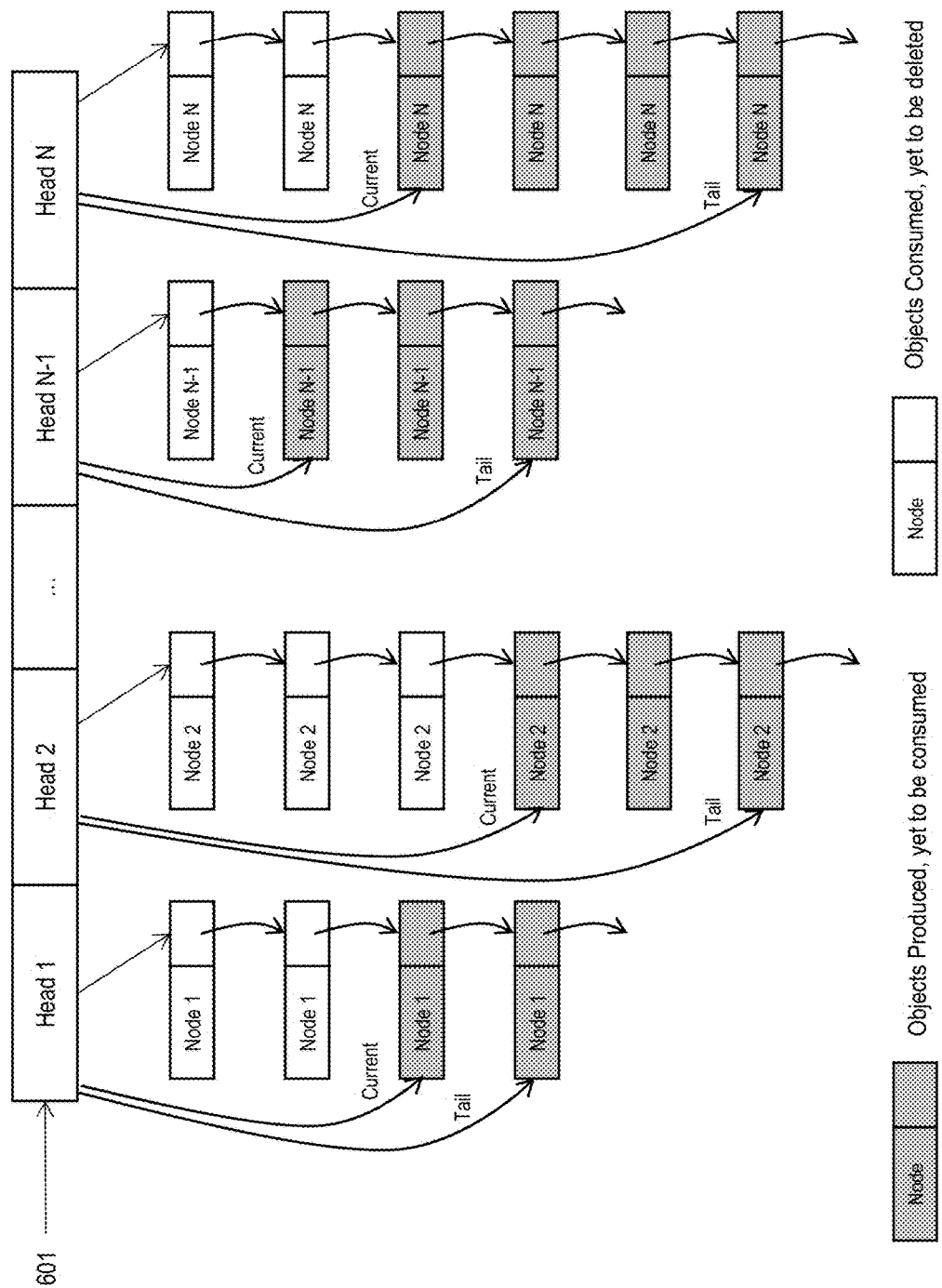
FIG. 6 illustrates a block diagram an example multi-producer multi-consumer (MPMC) lockless queue, according to one embodiment.

FIG. 6 illustrates a block diagram an example multi-producer multi-consumer (MPMC) lockless queue, according to one embodiment. The MPMC lockless queue has a control array 601 of N number of head nodes (Head 1-Head N), where N corresponds to the number of threads on which producers are scheduled to run. While the producers are scheduled to run on the N number of threads, and consumers are scheduled to run on M number of threads. The number of producers and the number of threads N may be different because a single producer can run on multiple threads. Similarly, the number of consumers and the number of threads M may be different because a single consumer can run on multiple threads and consume nodes produced by multiple producers. On the control array 601, the producers can produce nodes, and consumers can consume the nodes. The control structure corresponding to each of the N threads maintains a SPSC lockless queue. The consumers maintain the control array 601 of the N threads.

According to one embodiment, the MPMC lockless queue provides an exclusive access to a thread using a thread identifier (ID). For example, a producer running on a given thread may need to produce a new node into the corresponding queue. When adding the new node, the producer can have an exclusive access to the queue by indexing its thread identifier (ID) into the control array 601. Because each producer needs to obtain an exclusive access to a queue to produce a new node, there is no contention between multiple producers. A consumer running on a given thread can consume multiple nodes that belong to multiple producers. Similarly, there is no contention between multiple consumers as each consumer has an exclusive access to the queues in the control array 601.

Figure 7:
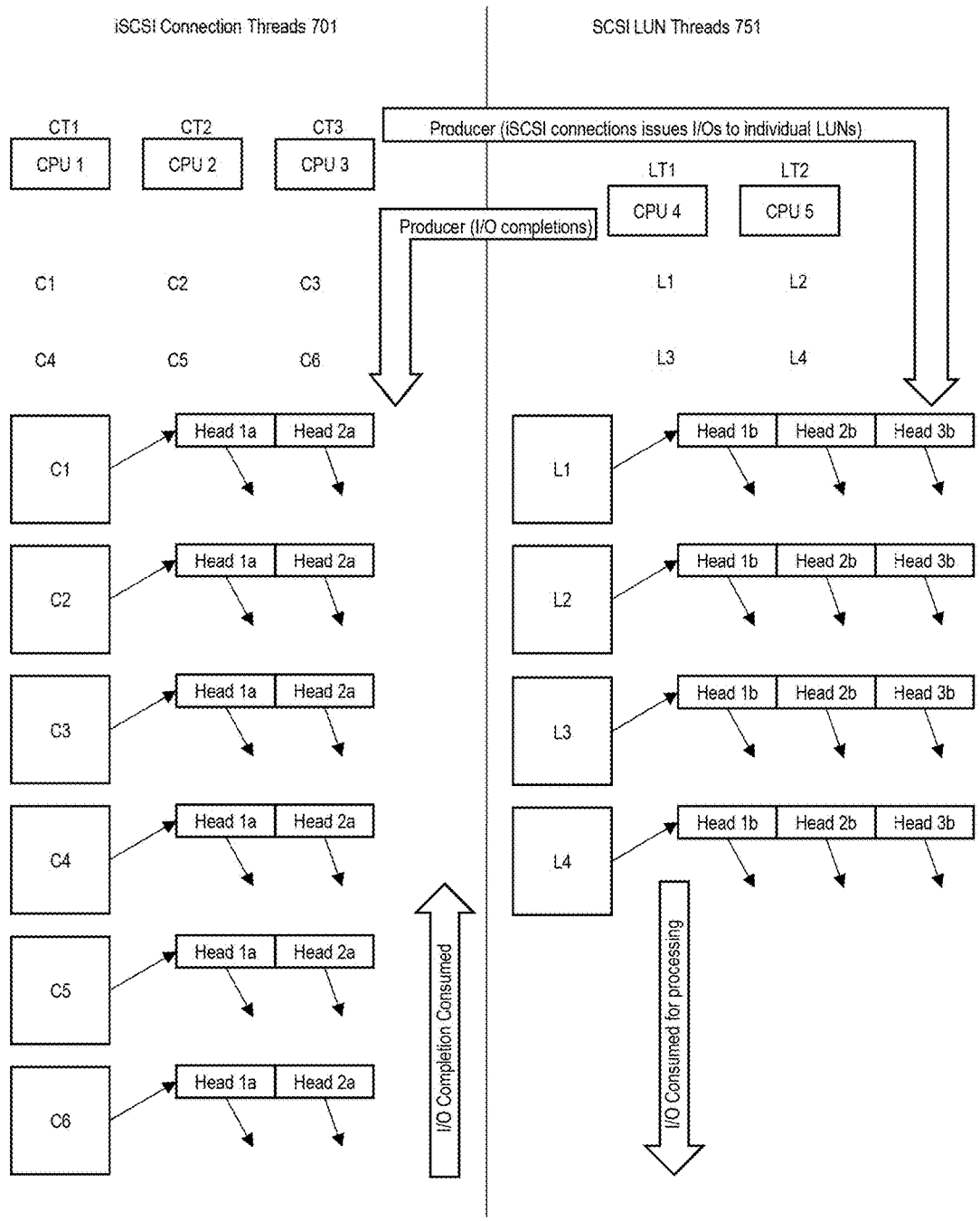
FIG. 7 illustrates a block diagram of an example threading model, according to one embodiment.

FIG. 7 illustrates a block diagram of an example threading model, according to one embodiment. The present threading model includes a plurality of iSCSI connection threads 701 and a plurality of SCSI LUN threads 751. For the purpose of explanation, the iSCSI connection threads 701 run on three CPUs, and the SCSI LUN threads run on two CPUs. Each of the iSCSI connection threads 701 includes two nodes (i.e., Head 1a and Head 2a) that correspond to each of the CPUs that run the SCSI LUN threads 751. Each of the SCSI LUN threads 751 includes three nodes (i.e., Head 1b, Head 2b, and Head 3b) that correspond to each of the CPUs that run the iSCSI connection threads 701. Although the present example includes three CPUs assigned to respectively run each of three iSCSI connection threads 701 and two CPUs assigned to respectively run each of the SCSI LUN threads 751, it is understood that the present threading model can be applied to any number of iSCSI connection threads and SCSI LUN threads without deviating from the scope of the present disclosure. Each iSCSI connection thread (CT1, CT2, CT3) is assigned to each CPU (CPU 1, CPU 2, and CPU 3). Similarly, each SCSI LUN thread (LT1 and LT2) is assigned to each CPU (CPU 5 and CPU 6). The 6 iSCSI connections C1 . . . C6 can be serviced by iSCSI threads CT1, CT2, and CT3. The 4 LUNs L1 . . . L4 can be serviced by the SCSI LUN threads LT1 and LT2.

The producer connection threads (e.g., iSCSI connection thread 701) produce I/O commands (to be processed) directly to a per-LUN queue indexed by a respective CPU-ID. The SCSI LUN threads 751 produce I/O commands (completed) directly to a per-connection queue according to the I/O commands produced by the iSCSI connection threads 701 as indexed by a respective CPU-ID. The consumer connection threads (e.g., SCSI LUN threads) consume the I/O commands that belong to that connection. The SCSI LUN threads 751 consume the I/O commands that belong to the LUN. The iSCSI connection threads 701 (producer) can issue I/O commands directly to the individual SCSI LUN threads 751 (consumer), and the SCSI LUN threads 751 (producer) can issue I/O completion directly to the individual iSCSI connection threads 701 (consumer). Each I/O command can be identified by a CPU-ID that is unique to the processor running a particular thread, thereby eliminating a need for synchronization points or locks among the threads running independently.

Figure 8:
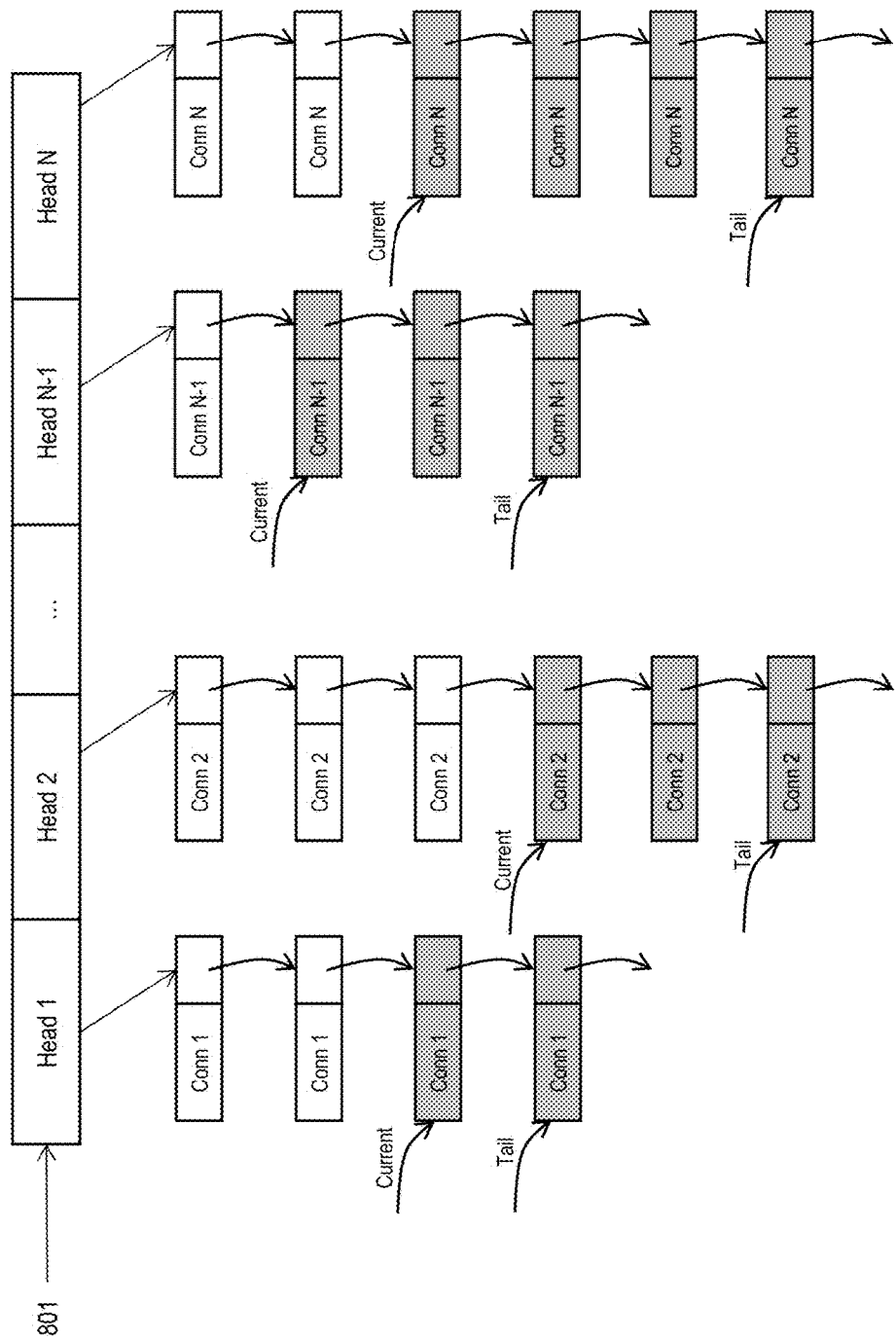
FIG. 8 illustrates a block diagram of an example MPMC lockless queue, according to another embodiment.

FIG. 8 illustrates a block diagram of an example MPMC lockless queue, according to another embodiment. In an I/O issue path, a producer may be a transport protocol layer, and a consumer may be the SCSI core layer. The transport protocol thread (e.g., iSCSI receiver path 301 of FIG. 3) accesses the LUN array 801 of N CPUs, where N is the number of CPUs assigned for the transport protocol threads. An array index refers to a CPU number (1, 2, . . . , N) on which the transport protocol thread is running on. Each of the array indices has a lockless single linked list, on which the transport protocol thread generates the work request for I/O commands issued to a particular LUN. A SCSI core thread (e.g., SCSI command issue path 302 of FIG. 3) executes on a corresponding SCSI core CPU that processes the work entries that are queued by the transport protocol threads. The SCSI core thread updates a current pointer in the thread running on the corresponding SCSI core CPU. The SCSI modules (LUNs) own the data structure as described in FIG. 8 and provide an interface to the iSCSI modules (the transport protocol layer) to produce and post I/O requests.

Figure 9:
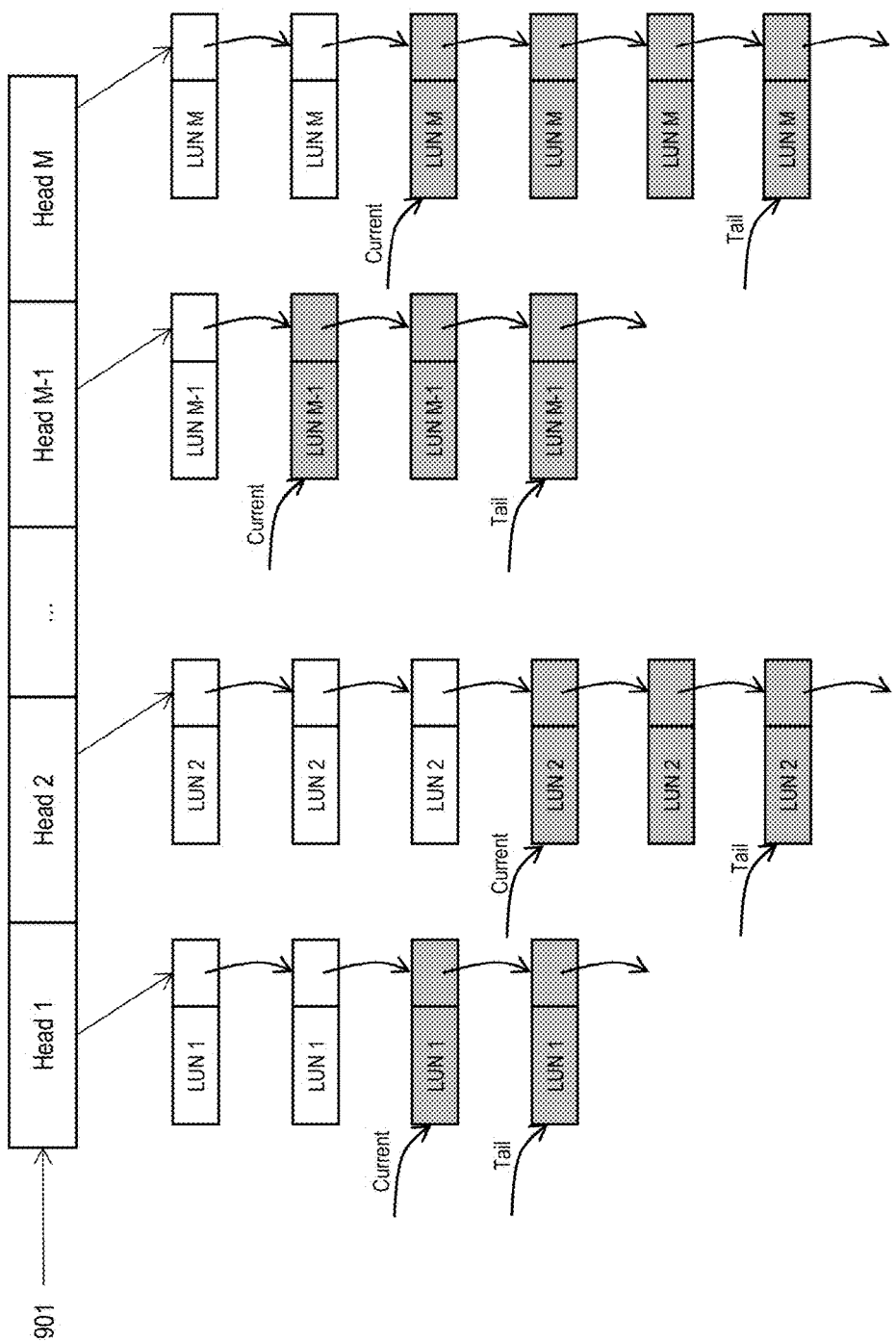
FIG. 9 illustrates a block diagram of an example MPMC lockless queue, according to yet another embodiment.

FIG. 9 illustrates a block diagram of an example MPMC lockless queue, according to yet another embodiment. In an I/O completion path, a producer may be a SCSI core layer, and a consumer may be the transport protocol layer. The LUN thread (e.g., SCSI command completion path 303 of FIG. 3) accesses a per-connection array 901 of M CPUs, where M is the number of CPUs assigned for SCSI core threads. An array index refers to a CPU number (1, 2, . . . , M) on which the SCSI core thread is running on. Each of the array indices has a lockless single linked list, on which the SCSI core thread generates the work requests for completed I/O commands for a particular connection. A transport protocol thread (e.g., iSCSI transmitter path 304 of FIG. 3) executing on a corresponding CPU processes the I/O commands that are queued by all SCSI core threads. The iSCSI thread updates a current pointer in the iSCSI thread running on the corresponding transport protocol CPU. The iSCSI modules (iSCSI connection) own the data structure as described in FIG. 9 and provide an interface to the SCSI modules (SCSI core layer) to produce and post I/O completions.

The present system and method separates out transport processing and data (or core) processing. The present system and method implements a multi-producer-multi-consumer lockless design that resolves synchronization issues that are inherent with the transport processing and data processing. The present system and method provides resource (e.g., CPU) sharing between the transport processing and data processing to accommodate the different and varying needs for the resources for each of the transport layer and the core layer. I/O write (IOW) and the ratio of CPU resources can vary based on the system configuration.

According to one embodiment, a method includes: receiving commands to access data stored in a target of a data storage system, wherein the data storage system includes a plurality of CPUs; running a plurality of transport threads on a first group of CPUs of the plurality of CPUs, wherein each of the plurality of transport threads comprises a command receiver path and a command transmitter path; running a plurality of data path threads on a second group of CPUs of the plurality of CPUs, wherein each of the plurality of data path threads comprises a command issue path and a command completion path; posting an I/O command to an I/O command issue queue using the command receive path of a transport thread, and processing the I/O command using the command issue path of a data path thread; and posting an I/O completion notification to an I/O completion queue using the command completion path of the data path thread, and processing the I/O completion notification using the command transmitter path of the transport thread. The I/O command issue queue comprises a first array of queues, and each of the first array of queues corresponds to a respective CPU of the first group of CPUs. The I/O completion queue comprises a second array of queues, and each of the second array of queues corresponds to a respective CPU of the second group of CPUs.

The transport thread may include a receiver and a transmitter, and the receiver may send an I/O command to the data path.

The data path thread may send the I/O command to the target and receive status and/or data from the target, and transmit the status and/or data to the transmitter of the transport thread.

The first array of queues may include a first number of nodes that corresponds to the number of the second group of CPUs assigned to the data path threads.

The first number of nodes may include a header node, a tail node, and a current node that points to a queue of the first array of queues, and nodes from the current node to the tail node may be owned by a consumer, and the remaining nodes of the first array of queues may be owned by a producer.

The producer may be the initiator and the consumer may be the target.

The consumer may obtain an exclusive access to the queue using a thread identifier that is unique to each of the data path threads.

The second array of queues may include a second number of nodes that corresponds to the number of the first group of CPUs assigned to the transport threads.

The second number of nodes may include a header node, a tail node, and a current node that points to a queue of the second array of queues, and nodes from the current node to the tail node may be owned by a consumer, and the remaining nodes of the first array of queues may be owned by a producer.

The producer may be the target and the consumer may be the initiator.

The consumer may obtain an exclusive access to the queue using a thread identifier that is unique to each of the transport threads.

Each of the I/O command issue queue and the I/O completion queue may be a multi-producer multi-consumer (MPMC) lockless queue. Work requests from one or more transport threads can reach a particular data path thread, and work requests from a particular transport thread can reach one or more data path threads. Similarly, work requests from one or more data path threads can reach a particular transport thread and work requests from a particular data path thread can reach one or more transport threads.

According to another embodiment, a data storage system includes: a plurality of CPUs; a plurality of targets; and a memory storing a set of software modules for processing I/O flows and an I/O command issue queue, and an I/O completion queue. The set of software modules is configured to: receive I/O commands to access data stored in a target of a data storage system, the data storage system includes a plurality of CPUs; run a plurality of transport threads on a first CPU among a first group of CPUs of the plurality of CPUs, wherein each of the plurality of transport threads comprises a command receiver path and a command transmitter path; and run a plurality of data path threads on a second CPU among a second group of CPUs of the plurality of CPUs, wherein each of the plurality of data path threads comprises a command issue path and a command completion path. The command receiver path of a transport thread posts an I/O command to the I/O command issue queue, and the command issue path of a data path thread processes the I/O command. The command completion path of the data path thread posts an I/O completion notification to the I/O completion queue, and the command transmitter path of the transport thread processes the I/O completion notification. The I/O command issue queue comprises a first array of queues, and each of the first array of queues corresponds to a respective CPU of the first group of CPUs. The I/O completion queue comprises a second array of queues, and each of the second array of queues corresponds to a respective CPU of the second group of CPUs.

The transport thread may include a receiver and a transmitter, and the receiver may send an I/O command to the data path.

The data path thread may send the I/O command to the target and receive status and/or data from the target, and transmit the status and/or data to the transmitter of the transport thread.

The first array of queues may include a first number of nodes that corresponds to the number of the second group of CPUs assigned to the data path threads.

The first number of nodes may include a header node, a tail node, and a current node that points to a queue of the first array of queues, and nodes from the current node to the tail node may be owned by a consumer, and the remaining nodes of the first array of queues may be owned by a producer.

The producer may be the initiator and the consumer may be the target.

The consumer may obtain an exclusive access to the queue using a thread identifier that is unique to each of the data path threads.

The second array of queues may include a second number of nodes that corresponds to the number of the first group of CPUs assigned to the transport threads.

The second number of nodes may include a header node, a tail node, and a current node that points to a queue of the second array of queues, and nodes from the current node to the tail node may be owned by a consumer, and the remaining nodes of the first array of queues may be owned by a producer.

The producer may be the target and the consumer may be the initiator.

The consumer may obtain an exclusive access to the queue using a thread identifier that is unique to each of the transport threads.

Each of the I/O command issue queue and the I/O completion queue may be a multi-producer multi-consumer (MPMC) lockless queue. Work requests from one or more transport threads can reach a particular data path thread, and work requests from a particular transport thread can reach one or more data path threads. Similarly, work requests from one or more data path threads can reach a particular transport thread and work requests from a particular data path thread can reach one or more transport threads.

The above example embodiments have been described hereinabove to illustrate various embodiments of implementing a system and method for providing a high performance lockless scalable target. Various modifications and departures from the disclosed example embodiments will occur to those having ordinary skill in the art. The subject matter that is intended to be within the scope of the present disclosure is set forth in the following claims.

What is claimed is:

1. A method comprising:
receiving commands to access data stored in a target of a data storage system, wherein the data storage system includes a plurality of CPUs;
running a plurality of transport threads on a first group of CPUs of the plurality of CPUs, wherein each of the plurality of transport threads comprises a command receiver path and a command transmitter path;
running a plurality of data path threads on a second group of CPUs of the plurality of CPUs, wherein each of the plurality of data path threads comprises a command issue path and a command completion path;
posting an I/O command to an I/O command issue queue using the command receive path of a transport thread, and processing the I/O command using the command issue path of a data path thread; and
posting an I/O completion notification to an I/O completion queue using the command completion path of the data path thread, and processing the I/O completion notification using the command transmitter path of the transport thread,
wherein the I/O command issue queue comprises a first array of queues, and each of the first array of queues corresponds to a respective CPU of the first group of CPUs, and
wherein the I/O completion queue comprises a second array of queues, and each of the second array of queues corresponds to a respective CPU of the second group of CPUs.

2. The method of claim 1, wherein the transport thread comprises a receiver and a transmitter, and wherein the receiver sends an I/O command to the data path.

3. The method of claim 2, wherein the data path thread sends the I/O command to the target and receives status and/or data from the target, and transmits the status and/or data to the transmitter of the transport thread.

4. The method of claim 1, wherein the first array of queues comprises a first number of nodes that corresponds to the number of the second group of CPUs assigned to the data path threads.

5. The method of claim 4, wherein the first number of nodes comprises a header node, a tail node, and a current node that points to a queue of the first array of queues, and wherein nodes from the current node to the tail node are owned by a consumer, and the remaining nodes of the first array of queues are owned by a producer.

6. The method of claim 5, wherein the producer is the initiator and the consumer is the target.

7. The method of claim 6, wherein the consumer obtains an exclusive access to the queue using a thread identifier that is unique to each of the data path threads.

8. The method of claim 1, wherein the second array of queues comprises a second number of nodes that corresponds to the number of the first group of CPUs assigned to the transport threads.

9. The method of claim 8, wherein the second number of nodes comprises a header node, a tail node, and a current node that points to a queue of the second array of queues, and wherein nodes from the current node to the tail node are owned by a consumer, and the remaining nodes of the first array of queues are owned by a producer.

10. The method of claim 9, wherein the producer is the target and the consumer is the initiator.

11. The method of claim 10, wherein the consumer obtains an exclusive access to the queue using a thread identifier that is unique to each of the transport threads.

12. The method of claim 1, wherein each of the I/O command issue queue and the I/O completion queue is a multi-producer multi-consumer (MPMC) lockless queue, wherein work requests from one or more transport threads can reach a particular data path thread, and work requests from a particular transport thread can reach one or more data path threads, and wherein work requests from one or more data path threads can reach a particular transport thread and work requests from a particular data path thread can reach one or more transport threads.

13. A data storage system comprising:
a plurality of CPUs;
a plurality of targets; and
a memory storing a set of software modules for processing I/O flows and an I/O command issue queue, and an I/O completion queue,
wherein the set of software modules is configured to:
receive I/O commands to access data stored in a target of a data storage system, the data storage system includes a plurality of CPUs;
run a plurality of transport threads on a first CPU among a first group of CPUs of the plurality of CPUs, wherein each of the plurality of transport threads comprises a command receiver path and a command transmitter path; and
run a plurality of data path threads on a second CPU among a second group of CPUs of the plurality of CPUs, wherein each of the plurality of data path threads comprises a command issue path and a command completion path;
wherein the command receiver path of a transport thread posts an I/O command to the I/O command issue queue, and the command issue path of a data path thread processes the I/O command,
wherein the command completion path of the data path thread posts an I/O completion notification to the I/O completion queue, and the command transmitter path of the transport thread processes the I/O completion notification,
wherein the I/O command issue queue comprises a first array of queues, and each of the first array of queues corresponds to a respective CPU of the first group of CPUs, and
wherein the I/O completion queue comprises a second array of queues, and each of the second array of queues corresponds to a respective CPU of the second group of CPUs.

14. The data storage system of claim 13, wherein the transport thread comprises a receiver and a transmitter, and wherein the receiver sends an I/O command to the data path.

15. The data storage system of claim 13, wherein the data path thread sends the I/O command to the target and receives status and/or data from the target, and transmit the status and/or data to the transmitter of the transport thread.

16. The data storage system of claim 13, wherein the first array of queues comprises a first number of nodes that corresponds to the number of the second group of CPUs assigned to the data path threads.

17. The data storage system of claim 16, wherein the first number of nodes comprises a header node, a tail node, and a current node that points to a queue of the first array of queues, and wherein nodes from the current node to the tail node are owned by a consumer, and the remaining nodes of the first array of queues are owned by a producer.

18. The data storage system of claim 17, wherein the producer is the initiator and the consumer is the target.

19. The data storage system of claim 18, wherein the consumer obtains an exclusive access to the queue using a thread identifier that is unique to each of the data path threads.

20. The data storage system of claim 12, wherein the second array of queues comprises a second number of nodes that corresponds to the number of the first group of CPUs assigned to the transport threads.

21. The data storage system of claim 20, wherein the second number of nodes comprises a header node, a tail node, and a current node that points to a queue of the second array of queues, and wherein nodes from the current node to the tail node are owned by a consumer, and the remaining nodes of the first array of queues are owned by a producer.

22. The data storage system of claim 21, wherein the producer is the target and the consumer is the initiator.

23. The data storage system of claim 22, wherein the consumer obtains an exclusive access to the queue using a thread identifier that is unique to each of the transport threads.

24. The data storage system of claim 13, wherein each of the I/O command issue queue and the I/O completion queue is a multi-producer multi-consumer (MPMC) lockless queue, wherein work requests from one or more transport threads can reach a particular data path thread, and work requests from a particular transport thread can reach one or more data path threads, and wherein work requests from one or more data path threads can reach a particular transport thread and work requests from a particular data path thread can reach one or more transport threads.

* * * * *